United States Patent
Matsui et al.

(10) Patent No.: US 7,421,547 B2
(45) Date of Patent: Sep. 2, 2008

(54) STORAGE SYSTEM AND STORAGE CONTROL METHOD WITHOUT REQUIRING FORMATTING OF STORAGE DEVICE

(75) Inventors: Yuko Matsui, Odawara (JP); Junji Ogawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 253 days.

(21) Appl. No.: 11/246,255

(22) Filed: Oct. 11, 2005

(65) Prior Publication Data
US 2007/0043917 A1    Feb. 22, 2007

(30) Foreign Application Priority Data
Aug. 22, 2005  (JP) ............... 2005-239674

(51) Int. Cl.
  G06F 12/00  (2006.01)
  G11C 29/00  (2006.01)
(52) U.S. Cl. .............. 711/156; 711/114; 711/170; 711/173; 714/758; 714/763; 714/770
(58) Field of Classification Search ............ 711/156
    See application file for complete search history.

(56) References Cited

U.S. PATENT DOCUMENTS

| | | | | |
|---|---|---|---|---|
| 5,012,514 A | * | 4/1991 | Renton | 713/192 |
| 6,012,146 A | * | 1/2000 | Liebenow | 726/17 |
| 6,487,646 B1 | * | 11/2002 | Adams et al. | 711/163 |
| 2003/0120674 A1 | | 6/2003 | Morita et al. | |
| 2003/0131163 A1 | | 7/2003 | Ishii et al. | |

OTHER PUBLICATIONS

Intel, "Performing Hard Disk Drive Format with Attached SCSI Hard Disk May Fail [PDF]", http://www.intel.com/support/motherboards/server/sb/cs, (Apr. 19, 2005), XP002377613.
Microsoft, "Format", http://technet2.microsoft.com/WindowsServer/en/Library, (Jan. 21, 2005), XP002377614.
European Search Report dated May 4, 2006.

\* cited by examiner

Primary Examiner—Hyung Sough
Assistant Examiner—Kaushikkumar Patel
(74) Attorney, Agent, or Firm—Reed Smith LLP; Stanley P. Fisher, Esq.; Juan Carlos A. Marquez, Esq.

(57) ABSTRACT

Each storage unit is provided with a table for storing a corresponding unit ID and count value. The controller receives a formatting instruction specifying a first unit ID, and updates the count value on a table corresponding to the first unit ID. The controller receives a write command specifying a second unit ID, acquires a count value corresponding to the second unit ID from the table, and attaches the count value to the data, and writes the data to the storage unit. When a read command specifying the second unit ID is received, the controller reads the data from the storage unit, acquires the count value corresponding to the second unit ID from the table, compares this count value and the count value attached to the read data, sends the read data to the transmission source of the command if these values match, and does not send the data to the transmission source of the command if these values do not match.

14 Claims, 7 Drawing Sheets

| LU NUMBER | FORMATTING COUNT VALUE | LATEST FORMATTING TIME |
|---|---|---|
| LU0 | 2 | 2005/01/01 00:00:00 |
| LU1 | 5 | 2004/02/03 12:02:20 |
| LU2 | 10 | 2005/06/17 04:56:45 |
| LU3 | 17 | 2002/09/29 18:41:17 |
| : | : | : |

- DATA (e.g. 1 BLOCK) — 200
- FORMATTING COUNT VALUE — 201
- LRC — 202
- LA — 203

FIG. 2C

- 301 — FCV AREA
- 302 — DATA ASSURANCE CODE AREA
- 303 — DATA AREA
- 300 DISK AREA

| LU NUMBER | FORMATTING COUNT VALUE | LATEST FORMATTING TIME | FORMATTING COMPLETION FLAG |
|---|---|---|---|
| LU0 | 2 | 2005/01/01 00:00:00 | ON |
| LU1 | 5 | 2004/02/03 12:02:20 | OFF |
| LU2 | 10 | 2005/06/17 04:56:45 | ON |
| LU3 | 17 | 2002/09/29 18:41:17 | OFF |
| : | : | : | : |

FIG. 7B (12) United States Patent

US 7,421,547 B2

STORAGE SYSTEM AND STORAGE CONTROL METHOD WITHOUT REQUIRING FORMATTING OF STORAGE DEVICE

CROSS-REFERENCE TO RELATED APPLICATIONS

This application relates to and claims priority from Japanese Patent Application No. 2005-239674 filed on Aug. 22, 2005, the entire disclosure of which is incorporated herein by reference.

BACKGROUND OF THE INVENTION

1. Field of the Invention

The present invention relates to storage control technology.

2. Description of the Related Art

A storage system that can be connected to an external device, such as a host device and another storage system, is known. A storage system comprises a plurality of media drives (e.g. hard disk drives), for example, and a logical unit (hereafter LU) is provided by these plurality of media drives. The storage system can receive a write command from an external device, and write the data to an LU (also called a logical volume) according to the write command, or receive a read command from an external device, read the data from the LU and send it to the external device according to the read command. When data is written to an LU, some storage may attach a check code, for detecting whether the data is valid or not, to the data, and detect the validity of the data by checking the check code attached to the data when the data is read, so as to improve the reliability of the data. (In this description, this check code is called the "data assurance code" for convenience.) Examples of a data assurance code are LRC (Longitudinal Redundancy Check) which is a logical operation value, and a code comprised of the LU number be the data storage destination and a part (insignificant 2 bytes) of the logical block address (LBA) (hereafter this code is called an LA (Logical Address) for convenience).

In the case of this type of storage system, the data on the media drive and the data assurance code must be matched in advance before using an LU. In other words, formatting is necessary in advance. Otherwise when the data assurance code is checked, the data and the data assurance code may become inconsistent, and the data may be regarded as invalid.

Generally in formatting, data (such as value "0") must be written in the entire storage area of the media drive, but recently drive capacities are increasing and a lengthy time required for formatting is becoming a problem.

Also a technology called "quick formatting" (e.g. Japanese patent Application Laid-Open No. 2003-241904) is known. In quick formatting, formatting is executed in the background. In this case, the storage system manages the formatted area and the unformatted area, and when an access command, specifying a certain area (read command or write command), is received from an external device, the access command is processed if the formatted area is specified. If an unformatted area is specified, however, the storage system formats the specified area first before processing the access command, and after this formatting completes, the access command is processed.

In general formatting, data must be written in the entire area of the LU to be used to match the data on the drive and the data assurance code. LU creation and formatting may be performed at the factory, before shipping the storage system, so that the storage system can be used immediately after shipment. However recently as drive capacities increase and as storage system capacities (that is, the number of media drives to be installed) increase, formatting takes a long time, and the lengthy shipment related work is becoming a problem.

Also a storage system generally has a RAID (Redundant Array of Independent Inexpensive Disks), which features a redundancy in the case of drive failure. If a drive failure beyond redundancy occurs, the failed drive is replaced, and the LU using the drive after replacement is reformatted, then the data is loaded from such an external backup device as a tape device to restore the data. In such a case, urgent recovery is required, and the so called quick formatting may be used so that the data can be restored from the external backup device quickly. However even in quick formatting, formatting is performed in the background, so the performance of the storage system drops dramatically until quick formatting completely ends (e.g. it takes time to process an access command received from an external device).

SUMMARY OF THE INVENTION

With the foregoing in view, it is an object of the present invention to provide a new storage control technology that can decrease the time required for formatting.

Other objects of the present invention shall be clarified later in the description.

The storage system according to the present invention can communicate with an external device, that is an externally existing device. This storage system comprises a plurality of storage units for storing data, a management storage area for storing a unit ID and a specific code corresponding to each storage unit, and a controller. The controller receives the formatting instruction specifying a first unit ID (e.g. formatting instruction receive means), and (A) updates the specific code on the management storage area corresponding to the first unit ID (e.g. specific code update means). The controller receives a command specifying the second unit ID from the external device (e.g. command receive means), and (B) when data in the command is written to a certain storage unit corresponding to the second unit ID according to the command, the controller acquires a specific code corresponding to the second unit ID from the management storage area, attaches the acquired specific code to the data in the command (e.g. specific code attachment means), and writes the data to which the specific code is attached to a certain storage unit (e.g. data write means). On the other hand, (C) when the data is read from a certain storage unit corresponding to the second unit ID according to the command (e.g. data read means), the controller acquires a specific code corresponding to the second unit ID from the management storage area, compares the acquired specific code and the specific code attached to the read data (e.g. specific code comparison means), sends the read data to the transmission source of the command if the specific codes match, and does not send the read data to the transmission source of the command if the specific codes do not match (e.g. data return control means).

According to the first aspect of the present invention, when the data in the command is written to a certain storage unit, the controller determines the data assurance code (e.g. assurance code calculation means) from the data, attaches the determined data assurance code to the data (e.g. assurance code attachment means), and writes the data, to which the data assurance code and the specific code are attached, to the certain storage unit (e.g. the above mentioned data write means). And when the data is read from a certain storage unit, the controller checks the data assurance code attached to the read data if the specific codes match (e.g. assurance code check means), and sends the read data to the transmission source of the command if an error is not detected as the result of the check (e.g. the above mentioned data return control means).

Here the controller (e.g. the above mentioned specific code attachment means) may attach the acquired specific code between the data and the data assurance code.

According to the second aspect of the present invention, when data is read from the certain storage unit, and if the specific codes do not match, the controller (e.g. the above mentioned data return control means) prepares the data which indicates that nothing is written after the latest formatting instruction, instead of the read data, and sends the prepared data to the transmission source of the command.

According to the third aspect of the present invention, the controller does not accept a command from the external device when the specific code on the management storage area is being updated, and accepts the command from the external device immediately after the update ends.

According to the fourth aspect of the present invention, the controller (e.g. the above mentioned specific code attachment means) attaches the specific code in one block units.

According to the fifth aspect of the present invention, at least one storage area of the plurality of storage units is divided into a data area and a specific code area. When data is written to a specific storage unit, the controller (e.g. the above mentioned data write means) writes the data to a certain location of the data area, and writes a specific code attached to the data to a certain location of the specific code area related to the certain location of the data area.

According to the sixth aspect of the present invention, the controller comprises a microprocessor and a hardware circuit. The microprocessor analyzes the command received from the external device, and judges which one of write and read is to be performed. The hardware circuit performs the above mentioned processing (B) or the above mentioned processing (C) according to the result of the judgment.

According to the seventh aspect of the present invention, the controller multiplexes the acquired specific codes and attaches the multiplexed specific codes to the data in the command in the above mentioned (B) processing. And in the above mentioned processing (C), the controller compares each specific code attached to the read data with another specific code, judges the read data as invalid if the specific codes do not match, and if the specific codes match, the controller acquires the specific code corresponding to the second unit ID from the management storage area, and compares the acquired specific code and the specific code attached to the read data. Each specific data attached to the data may be attached to a location distant from other specific data.

According to the eighth aspect of the present invention, the plurality of units include a first type of storage unit in which the above mentioned processings (A), (B) and (C) are performed, and a second type of storage unit in which the formatting processing is performed in all or a part of the areas of the storage units. Formatting necessity information, to indicate whether formatting is necessary or not, is stored for each storage unit on the management storage area. And when the formatting instruction is received, the controller judges whether the storage unit corresponding to the first unit ID requires formatting or not from the formatting necessity information on the management storage area corresponding to the first unit ID, performs the above mentioned processing (A), (B) and (C) if formatting is judged to be unnecessary, and formats all or a part of the area of the corresponding storage unit, and does not perform the above mentioned (B) and (C) processings if formatting is judged to be necessary (e.g. formatting necessity control means).

According to the ninth aspect of the present invention, the specific code corresponding to each storage unit is a count value which indicates the count of receiving a formatting instruction specifying the unit ID of the storage unit.

DESCRIPTION OF THE PREFERRED EMBODIMENTS

An embodiment of the present invention will now be described with reference to the drawings.

The ultimate method to decrease the time required for formatting is not formatting. However none dare to think of applying this method to storage systems, where the reliability of data is increased by attaching and checking the data assurance code. This is because it has been regarded that formatting is indispensable for such type of storage systems.

However by the following invention by the inventor of this application, formatting can be unnecessary even for the type of storage system where a data assurance code is attached and checked.

Now an overview of an embodiment of this invention will be described.

Figure 6A:
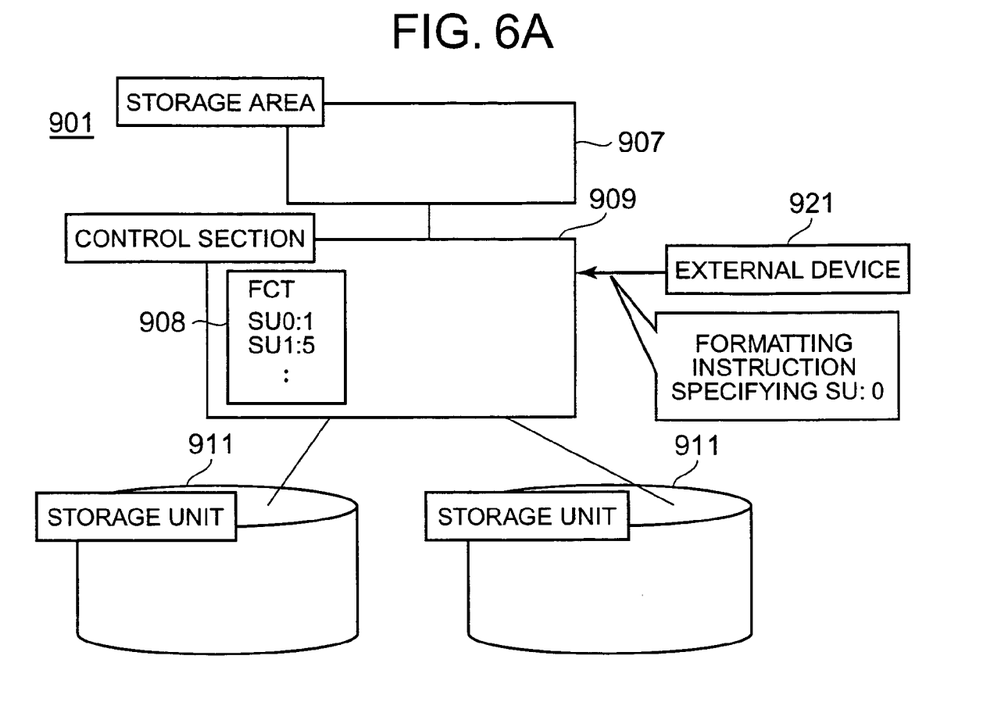
FIG. 6A is a diagram depicting the concept of an embodiment of the present invention.

FIG. 6A is a diagram depicting the concept of an embodiment of the present invention.

The storage system 901 can be communicably connected to an externally existing device (hereafter external device) 921. For the external device 921, at least one of the host device, another storage system and the maintenance terminal of the storage system 901 can be used.

The storage system 901 comprises a storage area 907 which can temporarily store data, a storage unit 911 which is one unit of the storage resource that can store data, and a controller 909 which can control the data transfer between the storage area 907 and the storage unit 911. A plurality of storage units 911 can be connected. Each storage unit 911 may be an individual media drive (e.g. hard disk drive) comprising a storage media (e.g. hard disk) which can store data, or each logical unit (LU) which is set using a storage resource of one or more media drives, or each of a plurality of logical storage devices constituting an LU.

This storage system 901 has a formatting count value table (hereafter "FCT") 908 in a location in a storage resource of the storage system 901. In FIG. 6A, the FCT 908 is stored in the storage resource of the controller 909, but may be stored in a storage area 907 or in a storage unit 911 instead. In the FCT 908, the formatting count value (hereafter "FCV") is recorded for each ID (e.g. unit number) of each storage unit 911. FCV of the storage unit 911 is a value to indicate how many times a formatting instruction was sent to the storage unit 911. According to the example in FIG. 6A, the formatting instruction was sent once to the storage unit 911 of which unit number (unit number of the storage unit is indicated as "SU" in FIG. 6A) is "0", and the formatting instruction was sent five times to the storage unit 911 of which unit number is "1".

An example of the flow of the processing performed in this embodiment will now be described.

Figure 6B:
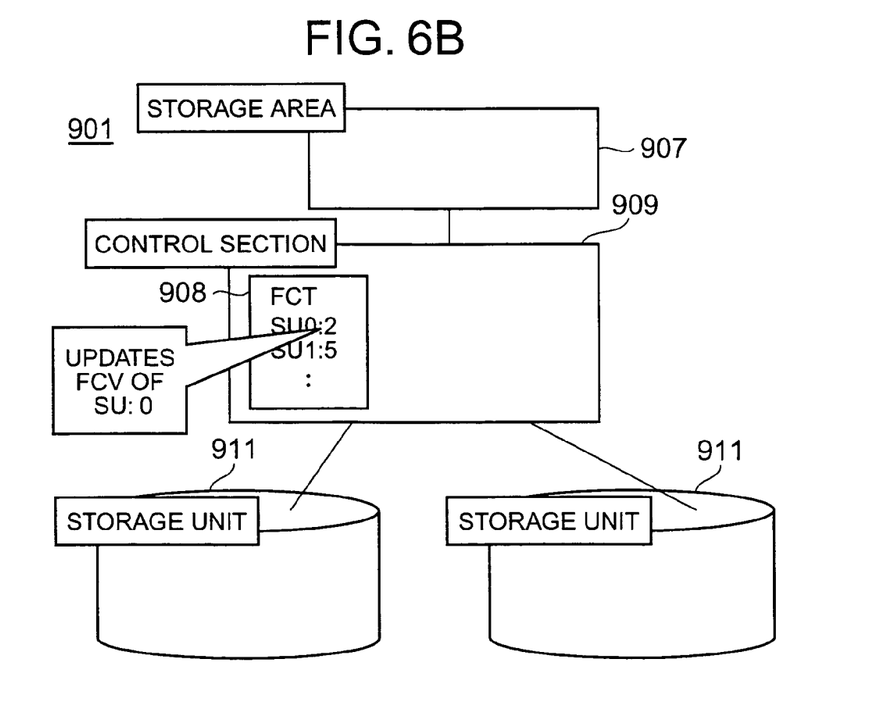
FIG. 6B is a diagram depicting the processing performed when a formatting instruction is received according to an embodiment of the present invention.

As FIG. 6A shows, the storage system 901 receives the formatting instruction specifying the unit number "0" from the external device 921. In this case, as FIG. 6B shows, the controller 909 accesses the FCT 908, and updates the FCV corresponding to the unit number "0" in the formatting instruction according to a predetermined rule. For example, the controller 909 increments the FCV corresponding to the unit number "0" by 1. As a result, the FCV corresponding to the unit number "0" changes from "1" to "2".

Figure 7A:
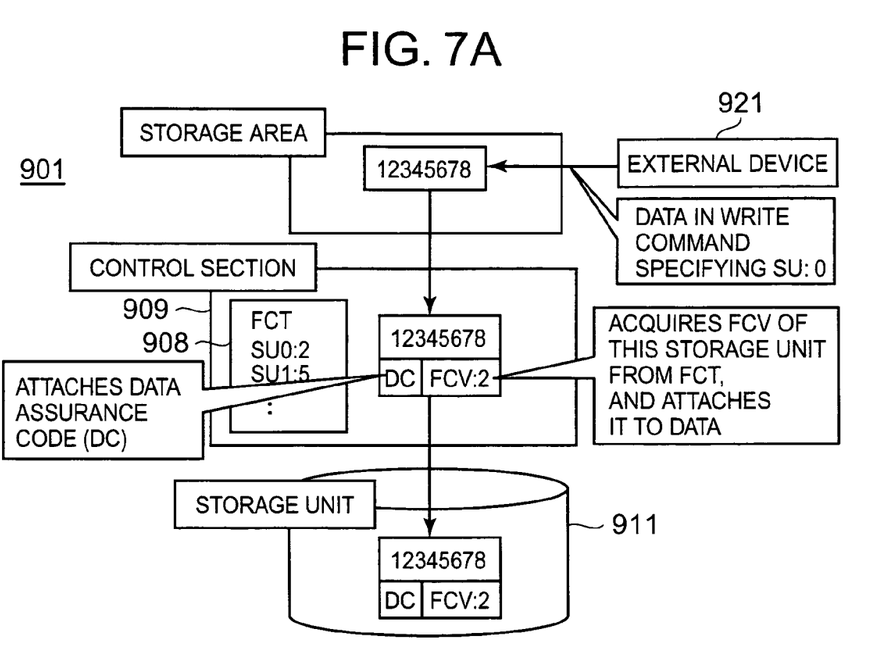
FIG. 7A is a diagram depicting an example of the processing performed when a write command is received according to an embodiment of the present invention.

Then it is assumed that the storage system 901 received a write command specifying the unit number "0" from the external device 921, as shown in the example in FIG. 7A.

In this case, the write target data "12345678" included in the write command is temporarily stored in the storage area 907.

And the controller 909 acquires the FCV "2" corresponding to the unit number "0" included in the write command from the FCT 908. The controller 909 reads the data "12345678" from the storage area 907, and attaches the acquired FCV "2" to the read data "12345678". The controller 909 also attaches the data assurance code ("DC" in the drawings) to the data "12345678". The controller 909 writes the data "12345678", to which the FCV "2" and the data assurance code are attached, in the storage unit 911 corresponding to the unit number "0" specified by the write command.

Figure 7B:
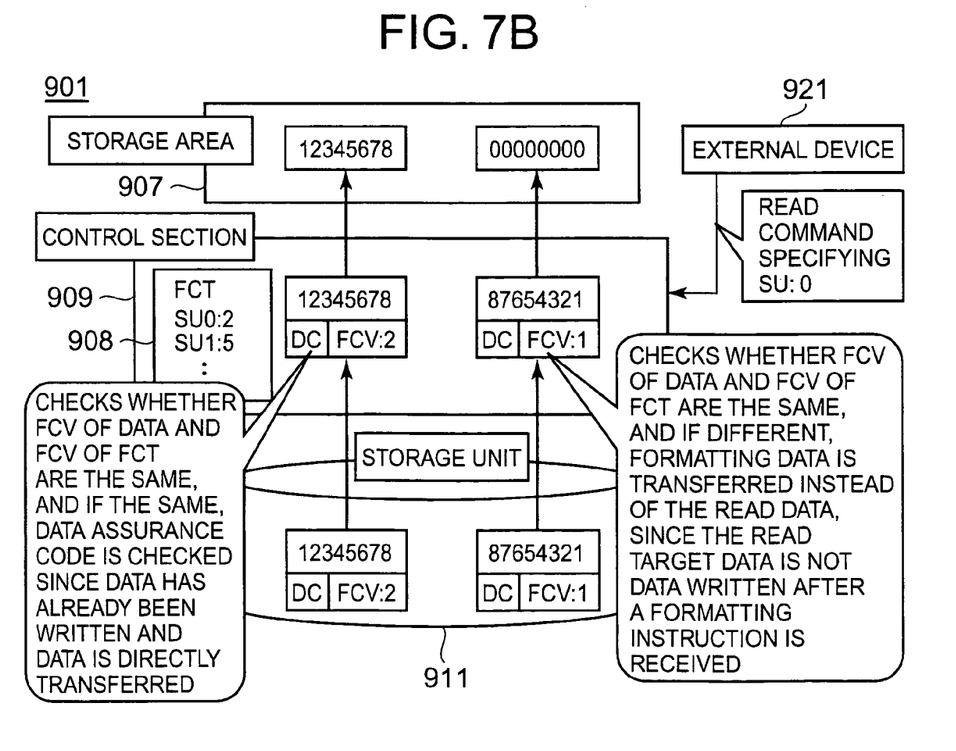
FIG. 7B is a diagram depicting an example of the processing performed when a read command is received according to an embodiment of the present invention.

Then as the example in FIG. 7B shows, it is assumed that the storage system 901 received a read command specifying the unit number "0" from the external device 921. Here it is assumed that the data "87654321" written when the FCV corresponding to the unit number "0" is "1", is stored in the storage unit 911 corresponding to the unit number "0".

The controller 909 reads the data specified by this read command from the storage unit 911 corresponding to the unit number "0" specified by the read command. And the controller 909 acquires the FCV corresponding to the unit number "0" from the FCT 908, and compares the acquired FCV and the FCV attached to the read data. If the read data of this result is "12345678" then the FCV attached to the data is "2" (that is, the data was written after the latest formatting instruction was received), and it matches the FCV "2" acquired from the FCT 908. However if the read data is "87654321", the FCV attached to the data is "1" (that is, the data existed before the latest formatting instruction was received), so it does not match the FCV "2" acquired from the FCT 908.

If the FCV read from the FCT 908 and the FCV attached to the data match in the judgment result, the controller 909 checks the data assurance code attached to the data, and writes the data in the storage area 907 if no error is detected in the result. The data written in the storage area 907 is transmitted to the external device 921, that is the transmission source of the read command.

If the FCV read from the FCT 908 and the FCV attached to the data do not match in the judgment result, the controller 909 notifies the external device 921, that is the transmission source of the read command, that data has not been written after the latest formatting instruction was received. Specifically the controller 909 writes the data to indicate that nothing has been written after the latest formatting instruction was received (e.g. a predetermined code group "00000000"), which indicates that formatting has been performed to the storage area 907 instead of the read data "87654321". The data written in the storage area 907 is sent to the external device 921. By this, the external device 921 can recognize that nothing has been written in the location specified by the read command after the latest formatting was instructed, although the data "87654321" actually exists there.

According to this embodiment, formatting can be unnecessary even if the storage system 901 is a type of storage system which attaches and checks the data assurance code.

Now more detailed examples of this embodiment will be described.

EXAMPLE 1

Figure 1:
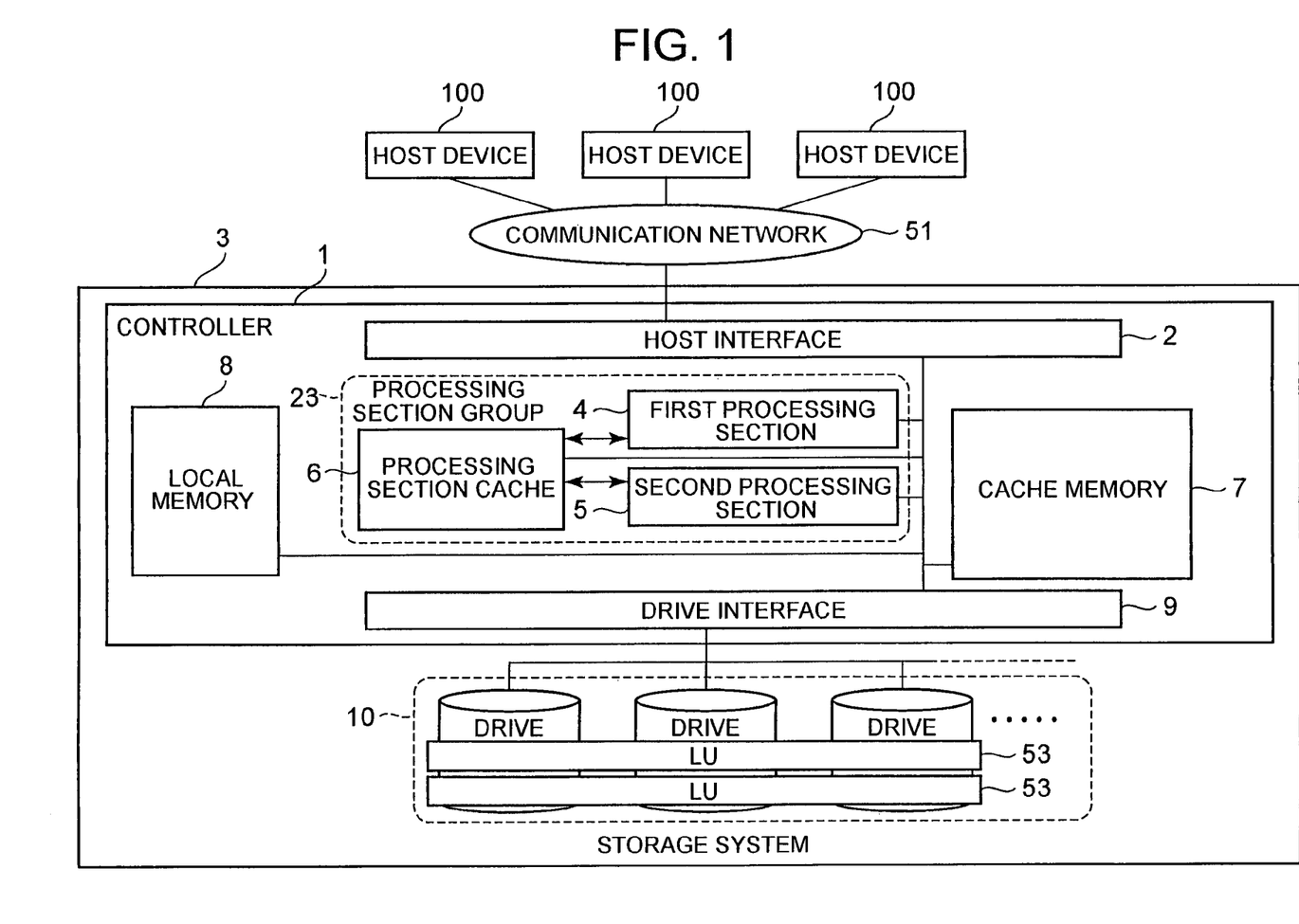
FIG. 1 is a diagram depicting a configuration example of the entire system according to a first example of the present invention.

FIG. 1 shows a configuration example of the entire system according to the first example.

A plurality (or one) of external devices 100, 100, ... and a storage system 3 are communicably connected via the communication network 51.

The external device 100 is a computer device comprising hardware resources, such as a CPU, memory and display device. The external device 100 can send a read command specifying an LU number or a write command having an LU number and write target data to the storage system 3.

Various networks can be used for the communication network 51. Specifically a SAN (Storage Area Network) and a LAN (Local Area Network), for example, can be used for the communication network 51.

The storage system 3 can be a disk array system, such as a RAID (Redundant Array of Independent Inexpensive Disks) comprised of many media drives disposed in an array.

The storage system 3 comprises a controller 1 for controlling data from the external device 100, and a plurality of disk drives (e.g. hard disk drives) 10 for storing data. In the plurality of media drives 10, one or a plurality of logical units (LUs) 53 are provided.

A plurality of controllers 1 may be installed to improve redundancy and to distribute processing load. The controller 1 can be comprised of one or a plurality of circuit boards. The controller 1 has a host interface 2 and a drive interface 9 to access the external device 100 and the drive 10. The controller 1 further comprises a processing section group 23 for processing and transferring data, a cache memory 7 for temporarily storing write target data from the external device 100 and data read from the drive, and a local memory 8 which can be accessed faster than the cache memory 7.

The processing section group 23 comprises the processing section cache 6. The processing section group 23 includes a plurality of processing sections to distribute load. Specifically the processing section group 23 includes, for example, a first processing section 4 for processing data and a second processing section 5 for transferring data.

The first processing section 4 can be a microprocessor, for example, which reads and executes computer programs, which are not illustrated. The first processing section 4 can analyze a command received from the external device 100, and judges whether it is a read command or a write command.

The second processing section 5 can be an LSI (Large Scale Integration), for controlling data transfer, for example, and more specifically, a hardware circuit such as an ASIC (Application Specific Integrated Circuit). The second processing section 5 has functions to control data exchange between the cache memory 7 and the drive 10, perform the parity operations of a RAID, and attach and check the data assurance codes. By this, the influence of overhead of the parity operations and the attaching and checking of data assurance codes can be separated from the first processing section 4, and a performance deterioration can be prevented.

As described later, the formatting processing in the background becomes unnecessary by attaching a formatting count value (FCV) to the data, but attaching or checking an FCV is always required when data is read from or written to the drive 10, and the processing overhead increases. In the first example however the attachment and check of the FCV can be performed at the hardware level, just like the parity operations and the attachment and check of data assurance codes, so a performance deterioration can be suppressed.

Figure 2A:
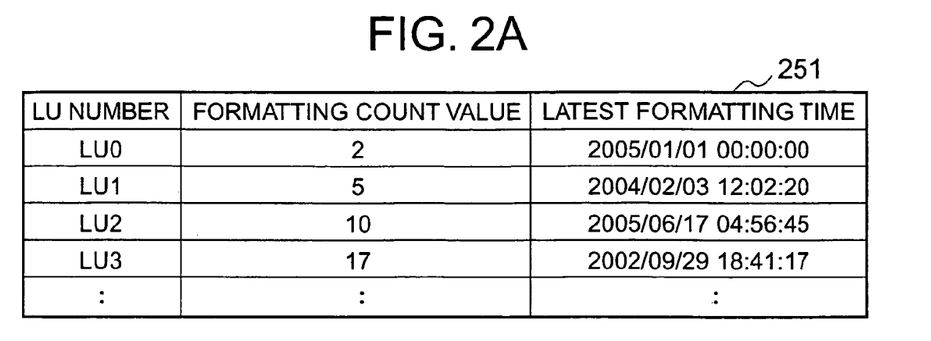
FIG. 2A shows a configuration example of the formatting count value table 251.

The storage system 3 has a formatting count value table (FCT) 215, of which an example is shown in FIG. 2A, in the controller 1. The FCT 251 may be stored in the storage resource in the controller 1, such as a cache memory 7, local memory 8 and processing section cache 6, by itself or multiplexed. The FTC 251 is stored in at least one of the plurality of disk drives 10 (e.g. system LU where information to be referred to for controlling the storage system 3 is stored), and data may be read and held from the drive 10 to the controller 1.

The FCT 251 is a table for managing an LU 53 in the storage system 3 and the number of times this LU 53 received a formatting instruction at a current point of time. The information items to be registered in the FCT 251 are, for example, the LU number, formatting count value to indicate the count of the current formatting, and the latest update time of the formatting count value. The update time is the time detected from the timer, which is not illustrated, in the storage system 3 (e.g. year, month, day, hour, minute, second), for example. The first processing section 4 can provide this update time to the external device 100 according to a request from the external device 100. The external device 100 can manage the provided update time as history.

The second processing section 5 can attach an FCV to data, and as a unit of data to which FCV is attached, various units can be used if data can be managed in the storage system by that unit. For example, such a unit may be a one bit unit, or a one block unit (e.g. 512 byte unit), or a unit striped on the drive 10 (hereafter stripe unit). If a small data unit, such as a one bit unit, is used, however, the ratio of the FCV taken in a predetermined data volume increases, which makes disk use efficiency drop. If a large data unit, such as a stripe unit, is used, on the other hand, formatting data is written to an area other than a written area, which increases processing overload. Therefore it is effective to use a data unit which is neither too small nor too large, such as a data unit with which all areas are written by one writing, a one block unit, for example. One block is a unit of the command sent by the OS (Operating System), which is not illustrated, of the host device 100, and is generally 512 bytes.

Figure 2B:
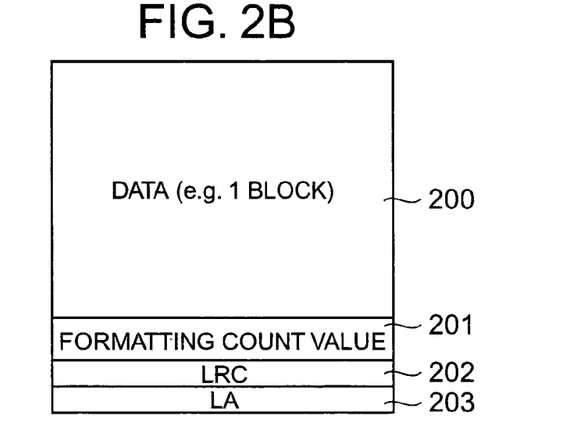
FIG. 2B shows a configuration example of the data group where FCV and the data assurance code are attached.

FIG. 2B shows a configuration example of a data group having an FCV and data to which a data assurance code is attached.

The data group shown in FIG. 2B, for example, is exchanged between the second processing section 5 and the drive 10. The data 200 is a data in one block units. In the insignificant side (that is the rear side) of the data 200, an LRC (Longitudinal Redundancy Check) 202 and an LA 203, for example, are attached as the data assurance codes. The LRC 202 is a logical operation value of the data 200. The LA 203 is a code comprised of an LU number to be the storage destination of the data 200 and a part (e.g. insignificant two bytes) of the logical block address (LBA).

An FCV 201 is attached to a location between the data 200 and the data assurance codes 202 and 203. By this, the data 200, data assurance codes 202 and 203 and the FCV 201 are stored in the same area of the drive 10, so reading the drive 10 can be executed at high-speed. When reading, the FCV 201 is checked before checking the data assurance codes 202 and 203, so attaching the FCV 210 immediately after the data 200 makes processing more efficient.

In this data group, the data 200, the FCV 201 and the data assurance codes 202 and 203 exist at predetermined positions in predetermined sizes respectively. By this, the data 200, the FCV 201 or the data assurance codes 202 and 203 can be selectively acquired from the data group merely by controlling the access location in the data group, so the second processing section 5 can be constructed as a hardware circuit.

Figure 2C:
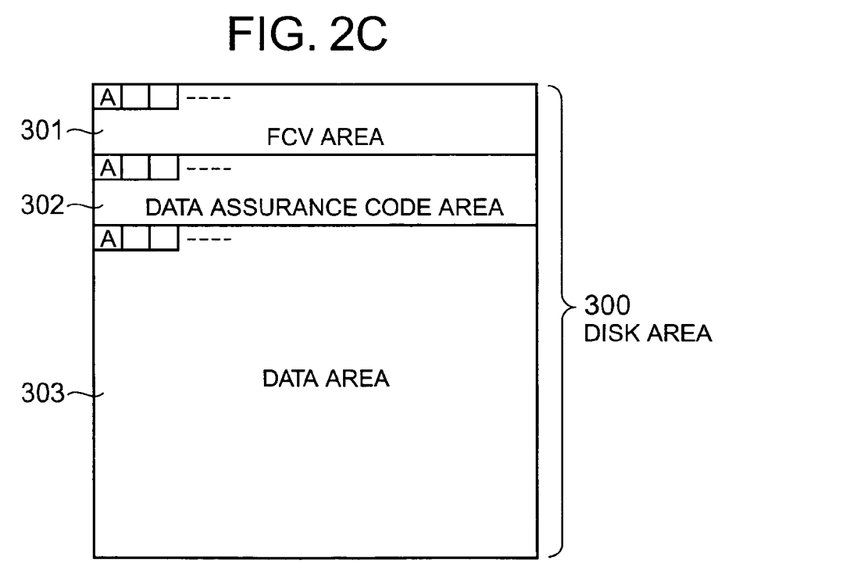
FIG. 2C shows a configuration example of LU 53.

In the present embodiment, the storage system shown in FIG. 2C may be used instead of or in addition to the system for storing the data group in the drive(s) 10, shown in FIG. 2B. Hereafter the case of using both of these storage system will be described as an example.

When the data group shown in FIG. 2B is stored in each drive 10 (or each LU 53), the second processing section 5 can distribute and store the FCV 201, the data assurance codes 202 and 203, and the data 200 included in the data group in the dedicated storage areas 301, 302 and 303 created on the drive 10 (or LU 53) respectively, as shown in FIG. 2C.

FIG. 2C shows a configuration example of the disk area 300, which is a storage area of the entire drive 10. This configuration example can also be applied to the LU 53.

The disk area 300 is divided into the FCV area 301 where an FCV is stored, the data assurance code area 302 where a data assurance code is stored, and the data area 303 where data is stored. And an FCV, data assurance code and data are stored such that the correspondence of an FCV, data assurance code and data constituting the above mentioned data group is known even if the disk area 300 is divided into these areas. In the case of the example in FIG. 2C, for example, if an FCV is stored in the first address A of the FCV area 301, the second processing section 5 stores the data assurance code of this data group in the first address A of the data assurance code area 302, and the data of this data group is stored in the first address A of the data area 303. By controlling the addresses of each area 301, 302 and 303 where a data group is stored in this way, an FCV, data assurance code and data of a same data group can be recognized. In other words, by managing the correspondence of the address of each area 301, 302 and 303, and the address of another 301, 302 and 303, an FCV, data assurance code and data constituting a same data group can be recognized when they are stored in the disk area 300.

Dividing the disk area into respective storage areas for an FCV, a data assurance code and data, as shown in FIG. 2C, has the following advantages. For example, when all FCVs are collectively updated (e.g. initialization), all FCVs are disposed in one area where the LUs 53 are continuous, and updating can be performed efficiently.

When the storage system 3 is initially constructed, an FCV on an LU 53 must be the initial value (e.g. "0"). This is because if an FCV is not an initial value at initial construction, an FCV in an LU 53 becomes the same as an FCV of FCT 251 while updating an FCV is repeated receiving a formatting instruction, and as a result, data, which is not the data written after receiving the latest formatting instruction, may be judged as valid data. Therefore when the storage system 3 is initially constructed, an FCV on an LU 53 must be assured to be an initial value. This can be implemented by installing a function to overwrite all FCVs in the FCV area 301, out of the disk are 300, to an initial value (hereafter called "initial formatting") in the storage system 3. According to the initial formatting function, only FCVs are overwritten to an initial value, so compared with formatting of the entire disk area 300, the data volume to be overwritten is much smaller, and the time required can be much shorter. Particularly when all FCVs are concentrated to a continuous area, as shown in FIG. 2C, writing can be executed sequentially, so high-speed initial formatting becomes possible.

An example of the flow of the processing to be performed in the above mentioned storage system 3 will be described with reference to the flow chart shown in FIG. 3.

When the external device 100 uses an LU for the first time, the information of the LU must be initialized first. So the external device 100 sends a formatting instruction, including the LU number of the LU, to the storage system 3. The storage system 3 receives the formatting instruction specifying the LU (step 101).

In response to this, the second processing section 5 (or the first processing section 4) specifies the FCV corresponding to the LU number specified in the formatting instruction from the FCT 251, and increments the specified FCV by 1 (step 102). From this point on, the storage system 3 can accept a read command and a write command from the external device 100, and can process the accepted command. In step 102, only the internal FCT 251 is updated, and a command cannot be accepted while the FCT 251 is being updated. This update, however, completes in a short time. Therefore the storage system 3 can accept a command from the external device 100 virtually immediately after the formatting instruction is received.

It is assumed that after the access of the LU specified by the formatting instruction is enabled, the storage system 3 received a command, including the LU number, from the external device 100 (step 103). The command to be received is not limited to an access command, such as a read command and a write command, but may be a command to perform processing where access to the LU 53 is generated within the storage system 3, such as a command to copy data between LUs in the storage system 3.

The first processing section 4 analyzes the received command and judges whether read is necessary or write is necessary (step 104). If the received command is a write command, the write target data, included therein, is stored in the cache memory 7.

If write is necessary ("write" in step 105) as a result of step 104, the first processing section 4 notifies this to the second processing section 5. The second processing section 5, which received this notice, reads the data from the cache memory 7, and attaches the data assurance code, which is calculated from the data or the above mentioned command, to the data (step 110). And the second processing section 5 acquires the FCV corresponding to the LU number specified by the command (hereafter "this LU number") from the FTC 251, and attaches the acquired FCV to the read data (step 111). The second processing section 5 writes the data group, including the data, FCV and data assurance code (e.g. data group having the structure shown in FIG. 2B) to this LU (step 112)., and returns a completion report to the external device 100 of the transmission source of the command when the writing completes (step 113). The timing to return the completion report may be the point of time just before the writing in step 112 completes (e.g. the point when it was judged that write is necessary).

If read is necessary as the result of step 104 ("read" in step 105), the first processing section 4 notifies this to the second processing section 5. The second processing section 5, which received this notice, reads the data specified by the command from this LU 53 (step 120). In this case, if the data group shown in FIG. 2B exists in this LU 53, the second processing section 5 reads the data group, but if a data, FCV and data assurance code constituting a same data group exists separately, as shown in FIG. 2C, these are read separately, and the data group is constructed.

The second processing section 5 acquires the FCV corresponding to this LU from the FCT 251, and compares the acquired FCV and the FCV in the data group which was read (step 121).

If the FCVs match as a result of step 121 ("same" in step 122), the second processing section 5 checks the data assurance code in the data group which was read, and if no error is detected as a result of the data assurance code check, the second processing section 5 writes the data in the data group to the cache memory 7 (step 123).

If the FCVs do not match as a result of step 121 ("different" in step 122), the second processing section 5 discards the read data group, and write formatting data to indicate that nothing was written after the latest formatting (e.g. data of which all bits are "0") to the cache memory 7 (step 124).

After step 123 or step 124, the second processing section 5 sends the data written to the cache memory 7 to the external device 100 of the command transmission source (step 125).

The above is the description on the first example. In this first example, at least one of the FCV area 301 and the data assurance code area 302 in FIG. 2C may be provided in the controller 1. By this, the seek time in the drive 10 can be decreased.

According to this first example, the FCT 251 for recording the FCV for each LU 53 is provided in the storage system 3. Every time a formatting instruction specifying an LU is received, the storage system 3 updates the FCV (FCV on FCT 251) corresponding to the LU. When data is written to the LU 53, the storage system 3 acquires the FCV corresponding to the LU 53 from the FCT 251, attaches the acquired FCV to the data, and stores it in the LU 53. When the data is read from the LU 53, the storage system 3 acquires the FCV corresponding to the LU 53 from the FCT 251, and compares the acquired FCV and the FCV attached to the read data. If the FCVs match, this can be regarded that the data was written after formatting, so the storage system 3 sends the read data to the read request source. If the FCVs do not match (or if an FCV has not been attached to the read data), this can be regarded that the data was not written after formatting, so the storage system 3 does not send the read data to the read request source. This makes formatting of an LU 53 unnecessary, so the time required for formatting can be virtually zero.

According to the first example, formatting becomes unnecessary while maintaining the reliability of data by a data assurance code. In other words, it has been thought that formatting is necessary in an environment where the data, to which a data assurance code is attached, is stored in an LU 53, since data and a data assurance code must be matched, but according to the first example, such formatting is unnecessary, which is a critical aspect of the first example. This means that in an environment where the data, to which a data assurance code is attached, is stored in an LU 53, the time required for formatting can be virtually zero.

Also according to the first example, when a formatting instruction is received, the command can be accepted after the FCV is updated in the FCT 251. The time required for an update is extremely short compared with writing to the drive 10. Therefore commands can be accepted from the external device 100 virtually immediately after a formatting instruction is received.

EXAMPLE 2

Now the second example of the present invention will be described. The differences from the first example will be primarily described, and description on the common aspects with the first example will be omitted or simplified (this is the same for the later mentioned third example).

The FCV attached to the data is an important value for judging whether the data is valid data written after a formatting instruction or the data is invalid data which has not been written.

In the second example, the FCV to be attached to the data is duplicated (or may be multiplexed, triplexed or more) to increase the reliability of the FCV itself which is attached to the data.

Figure 4A:
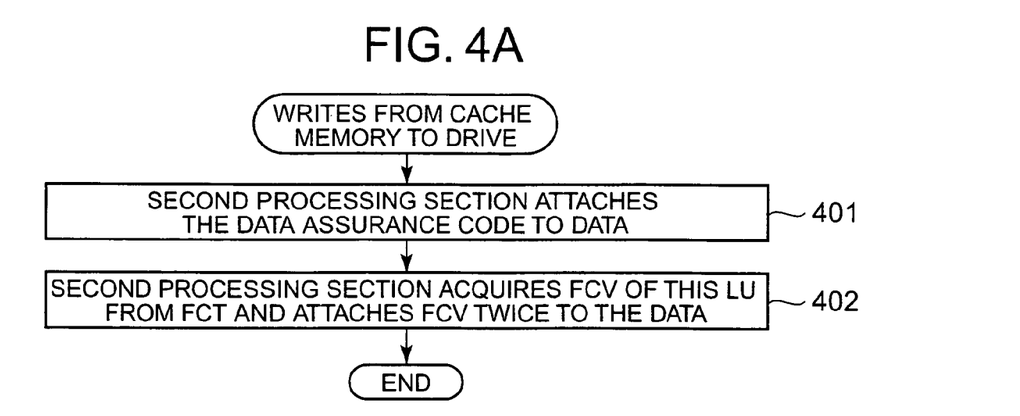
FIG. 4A is a flow chart depicting an example of the flow of the processing performed when the data is written from the cache memory 7 to the drive 10 (LU 53) according to a second example of the present invention.

FIG. 4A is an example of the flow of the processing performed when data is written from the cache memory 7 to the drive 10 (LU 53) according to the second example of the present invention.

Figure 5A:
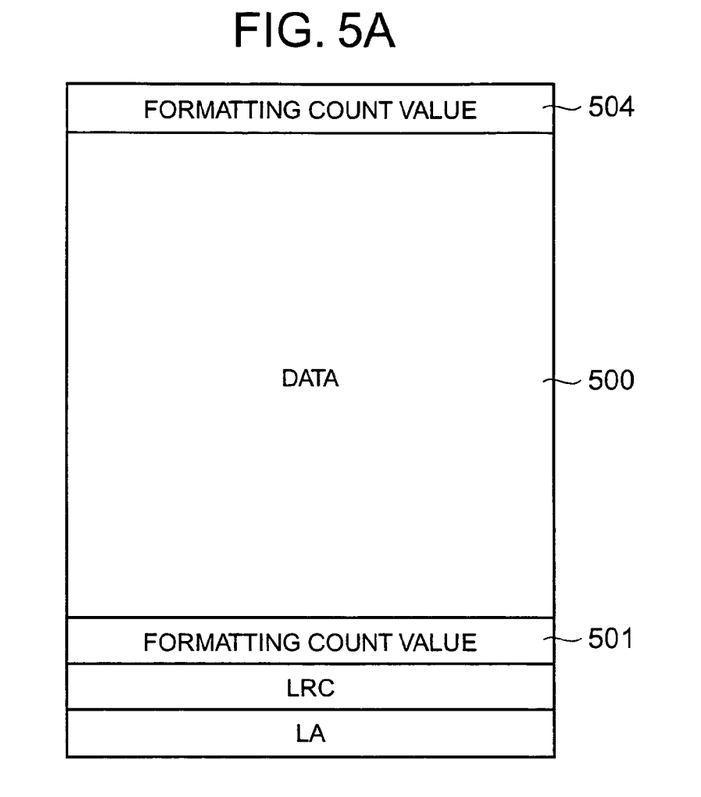
FIG. 5A shows a configuration example of the data group according to the second example of the present invention.

After the data assurance code is attached to the data (step 401), the second processing section 5 acquires the FCV corresponding to this LU from the FCT 251, duplicates the acquired FCV, and attaches the duplicated FCV (step 402). Specifically the second processing section 5 attaches the FCV to both the beginning and the end of the data 500, as shown in FIG. 5A.

Figure 4B:
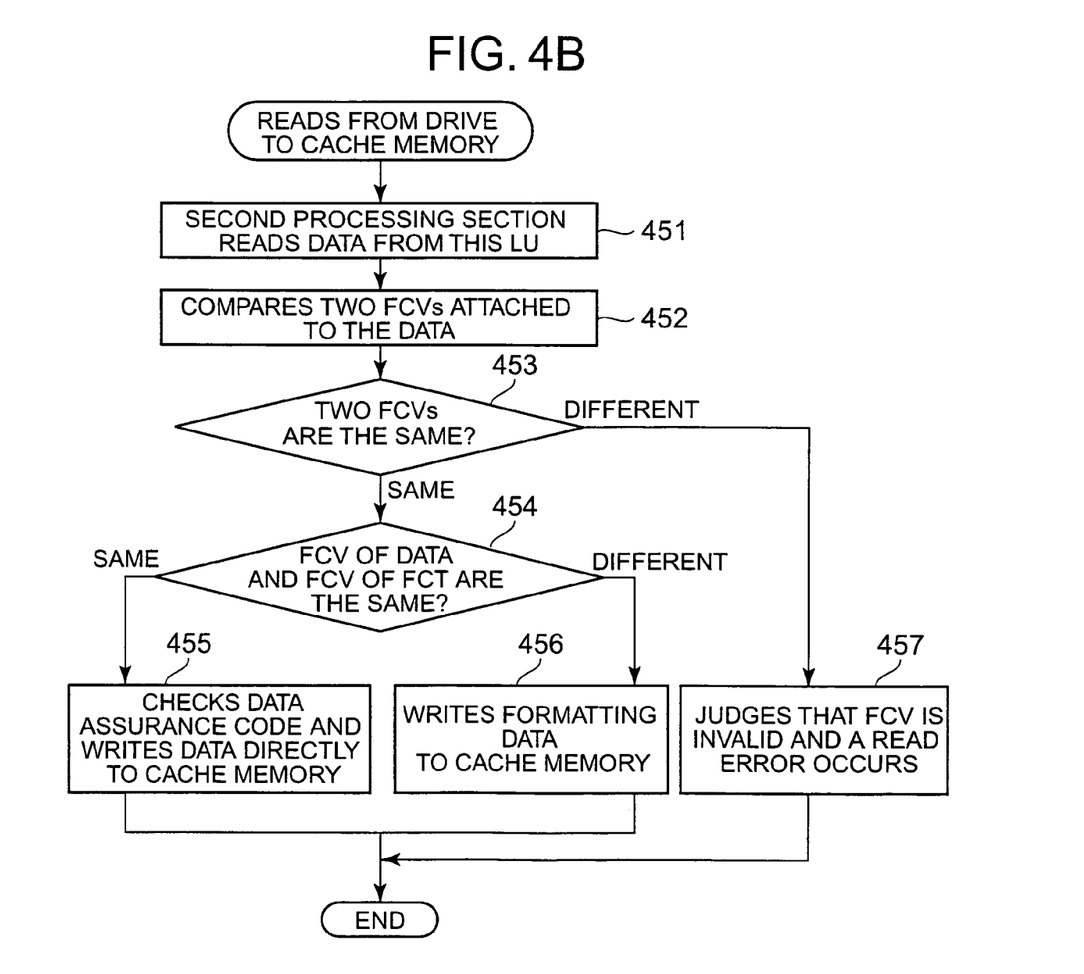
FIG. 4B is a flow chart depicting an example of the flow of the processing performed when the data is read from the drive 10 (LU 53) to the cache memory 7 according to the second example of the present invention.

Now an example of the flow of the processing performed when the data is read from the drive 10 (LU 53) to the cache memory 7 will be explained with reference to FIG. 4B.

The second processing section 5 reads data from this LU (step 451). And the second processing 5 compares the duplicated FCVs, attached to the data, with each other (step 452).

If the FCVs do not match as a result of step 452 ("different" in step 453), the second processing section 5 judges that the FCV is invalid, and a read error occurs (step 457). Specifically the second processing section 5 can notify the read error to the transmission source of the command, for example.

If the FCVs do match ("same" in step 453 as a result of step 452), the second processing section 5 acquires the FCV corresponding to this LU from the FCT 251, and compares the acquired FCV and the FCV attached to the data (step 454).

Figure 3:
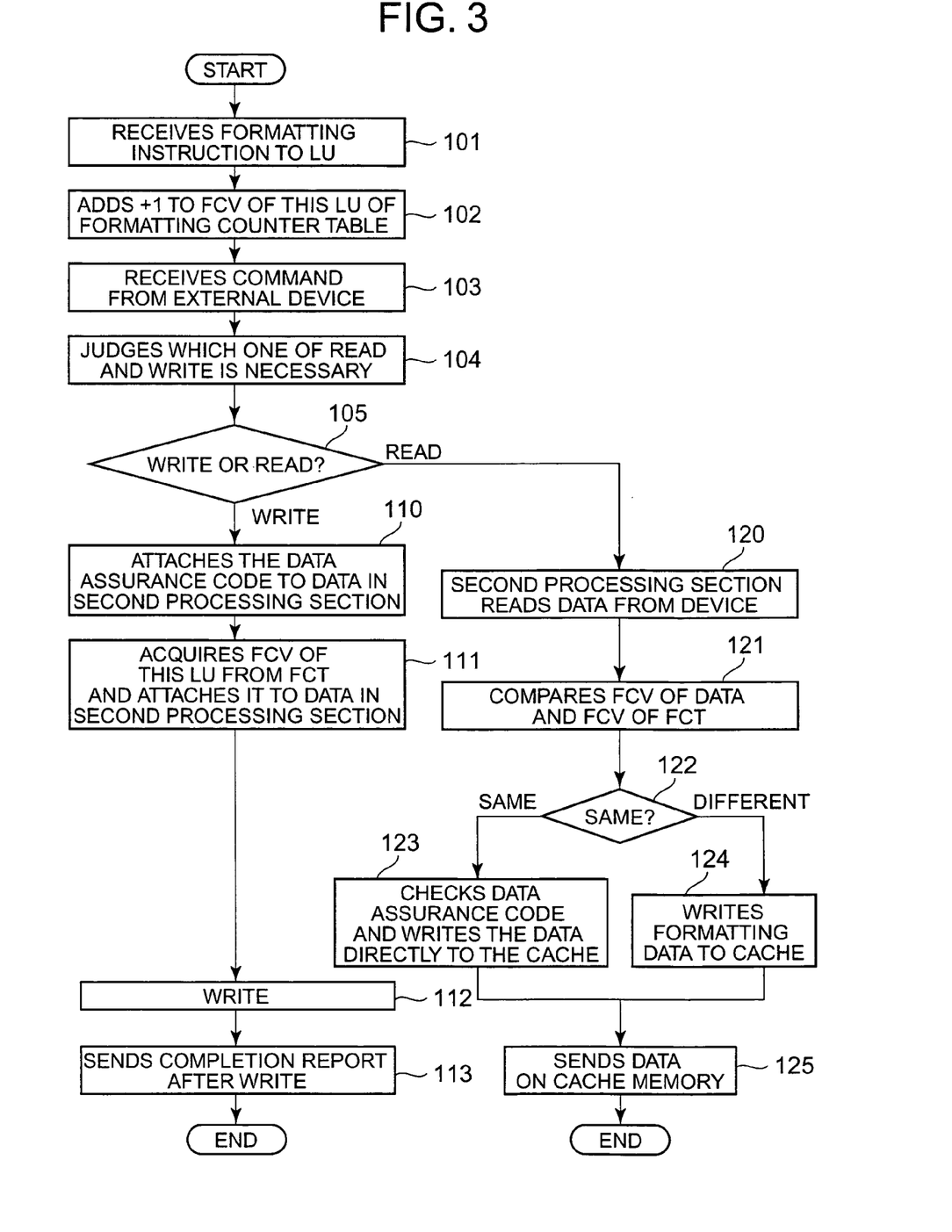
FIG. 3 is a flow chart depicting an example of the flow of processing performed in the storage system 3 according to the first example of the present invention.

If there is a match as a result of step 454, processing the same as step 123 in FIG. 3 is performed (step 455), and if there is no match, processing the same as step 124 in FIG. 3 is performed (step 456).

According to this second example, if each of the plurality of FCVs attached to the data do not match other FCVs, the FCV is judged as invalid and an error occurs. By this, invalid data can be prevented.

In the second embodiment, a duplicated FCV 501 and FCV 504 are attached to the beginning and the end of the data 500, as shown in FIG. 5A. FCV 501 and FCV 504 may be disposed continuously, but if they are physically close to each other then both FCVs may become invalid when a write error to the drive 10 or a data change on the drive 10 occurs. As FIG. 5A shows, by disposed FCV 501 and FCV 504 separately, FCV 501 and FCV 504 are stored to physically distant areas on the drive 10. Therefore the possibility for both FCV 501 and FCV 504 becoming invalid can be suppressed.

EXAMPLE 3

In the storage system according to the third example of the present invention, and LU which does not required formatting and an LU which requires formatting can coexist. In the LU 53 which requires formatting, formatting processing is performed on the entire area thereof. As a result, all the FCVs in the LU 53 become the latest status, and the entire area of the LU 53 has valid data.

Figure 5B:
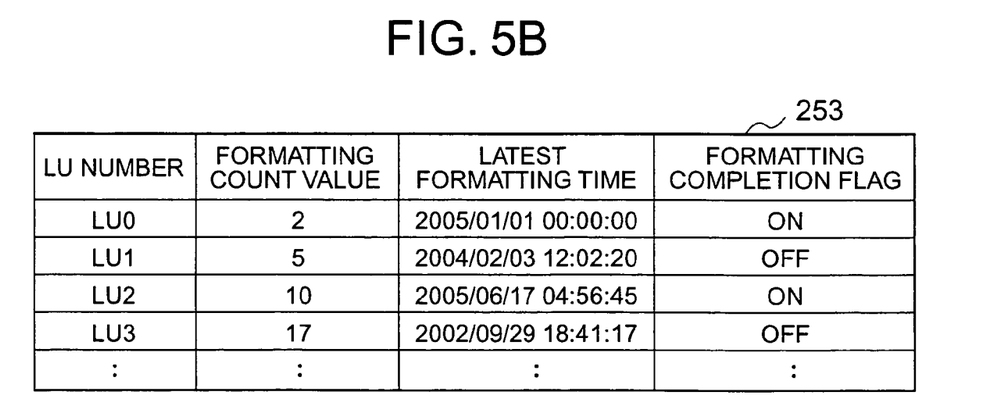
FIG. 5B shows a configuration example of the FCT 253 according to a third example of the present invention.

For an LU which requires formatting, the attachment and check of an FCV may be omitted. In this case, the FCT 253 shown in FIG. 5B can be used. In the FCT 253, a formatting completion flag for each LU is provided in addition to the items of the FCT 251 described in Example 1. The formatting completion flag is a flag for judging whether formatting is required for an LU. For an LU which requires formatting, ON is set as the formatting completion flag, and for an LU which does not require formatting, OFF is set as the formatting completion flag. This ON/OFF may be set by the second processing section 5, or by the first processing section 4.

If a formatting instruction is received, the second processing section 5 refers to the formatting completion flag corresponding to the LU specified by the formatting instruction, and performs step 102 and the later processing in FIG. 3 if the flag is OFF. If the flag is ON, however, the second processing section 5 formats all or a part of the areas of the specified LU.

When a command is received, the second processing section 5 refers to the formatting completion flag corresponding to the LU specified by the command, and performs step 104 and the later processing in FIG. 3 if the flag is OFF. If the flag is ON, however, the second processing section 5 does not attach or check the FCV for this LU, and regards the entire area of this LU 53 as valid data.

The reliability of the data existing in an LU which does not require formatting is inevitably lower compared with the reliability of data existing in an LU of which the entire area is formatted. But an LU which does not require formatting, certainly the time required for formatting is short compared with an LU which requires formatting. In the third example, an LU which does not require formatting and an LU which requires formatting can coexist, so the respective shortcomings can compensate each other. For example, an LU which requires formatting can be used for an LU 53 for storing data important for the user. And an LU which does not require formatting can be used as an LU of which the reliability of data can be somewhat low, such as a sub-volume, archive volume, or a volume for image distribution. By this, an LU which does not require formatting can be introduced without dropping the reliability of the entire system.

An embodiment of the present invention and some examples thereof were described above, but these are examples to describe the present invention, and are not intended to restrict the scope of the present invention to these embodiments and examples. The present invention can be embodied by various other forms.

For example, the matching of FCVs is not limited to a perfect matching of FCVs, but may be a substantial matching. For example, the case when one FCV is "N" and the other FCV is "-N" may be regarded as a match (e.g. N is 0 or a natural number).

Also the processing group 3 may be constructed by one microprocessor, or may be constructed by a plurality of microprocessors. In the latter case, processing may be shared by the plurality of microprocessors.

What is claimed is:

1. A storage system configured to communicate with an external device, that is an externally existing device, comprising:
    a plurality of storage units for storing data;
    a management storage area for storing a unit ID and a specific value corresponding to each storage unit; and
    a controller, wherein said controller
    (A) updates a specific value on said management storage area corresponding to a first unit ID of a certain storage unit, whenever receiving a formatting instruction specifying said first unit ID, and receives a command specifying a second unit ID from the external device, said second unit ID being identical with or different from said first unit ID,
    (B) when the command is a write command and data in said command is written to a certain storage unit corresponding to said second unit ID according to said command, acquires a specific value corresponding to said second unit ID from said management storage area, attaches said acquired specific value to the data in said command, and writes the data together with the attached specific value as a data group to said certain storage unit, and
    (C) when the command is a read command and a data group is read from a certain storage unit corresponding to said second unit ID according to said command, acquires a specific value corresponding to said second unit ID from said management storage area, compares said acquired specific value with a specific value attached to read data in said data group, sends said read data to the external device of said command if the specific values match, and does not send said read data to the external device of said command if the specific values do not match.

2. The storage system according to claim 1, wherein when the data in said command is written to said certain storage unit, said controller determines a data assurance code from said data, attaches said determined data assurance code to said data, and writes the data together with said data assurance code and said specific value as said data group to said certain storage unit, and when a data group is read from said certain storage unit, said controller checks a data assurance code attached to read data in said data group if the specific values match, and sends said read data to the external device of said command if no error is detected as the result of the check.

3. The storage system according to claim 2, wherein said controller attaches said acquired specific value to a location between said data and said data assurance code.

4. The storage system according to claim 1, wherein when said data group is read from said certain storage unit, and if the specific values do not match, said controller prepares data which indicates that nothing is written after the latest formatting instruction, and sends said prepared data to the external device of said command instead of said read data.

5. The storage system according to claim 1, wherein said controller does not accept a command from the external device when the specific value on said management storage area is being updated, and accepts the command from the external device immediately after the update ends.

6. The storage system according to claim 1, wherein said controller attaches said specific value in one block unit.

7. The storage system according to claim 1, wherein at least one storage area of said plurality of storage units is divided into a data area and a specific value area, and when said data group is written to said certain storage unit, said controller writes said data in a certain location of said data area, and writes the specific value attached to said data to a certain location of said specific value area related to the certain location of said data area.

8. The storage system according to claim 1, wherein
    said controller comprises a microprocessor and a hardware circuit,
    said microprocessor analyzes a command received from the external device and judges to perform write and read, and
    said hardware circuit performs said processing (B) or said processing (C) according to the result of said judgment.

9. The storage system according to claim 1, wherein said controller multiplexes said acquired specific values and attaches the multiplexed specific values to the data in said command in said processing (B), and
    in said processing (C), said controller compares each specific value attached to said read data with another specific value, judges said read data as invalid if the specific values do not match, and acquires the specific value corresponding to said second unit ID from said management storage area and compares said acquired specific value and the specific value attached to said read data if specific values match.

10. The storage system according to claim 9, wherein each multiplexed specific value is attached to said data at a location distant from other multiplexed specific values.

11. The storage system according to claim 1, wherein said plurality of storage units include first type of storage units in which said processings (A), (B) and (C) are performed, and second type of storage units in which formatting processing is performed in all or a part of the areas of the storage units,
    formatting necessity information to indicate whether formatting is necessary or not is stored for each storage unit on said management storage area, and
    when said formatting instruction is received, said controller judges whether the storage unit corresponding to said first unit ID requires formatting or not from the formatting necessity information on said management storage area corresponding to said first unit ID, performs said processings (A), (B) and (C) if formatting is judged to be unnecessary, and formats all or a part of the area of said corresponding storage unit, and does not perform said processings (B) and (C) if formatting is judged to be necessary.

12. The storage system according to claim 1, wherein the specific value corresponding to each storage unit is a count value which indicates the count of the received formatting instruction specifying the unit ID of that storage unit.

13. A storage control method for a storage system, comprising steps of:
    whenever receiving a formatting instruction having a first unit ID corresponding to one of a plurality of storage units configured to store data, specifying a specific value corresponding to said first unit ID from a management storage area for storing a unit ID and a specific value corresponding to each storage unit, and updating the specified specific value on said management storage area; and receiving a command specifying a second unit ID from the external device, said second unit ID being identical with or different from said first unit ID, (1) when the command is a write command and data in said command is written to a certain storage unit corresponding to said second unit ID according to said command, acquiring a specific value corresponding to said second unit ID from said management storage area, attaching said acquired specific value to the data in said command, and writing the data together with the attached specific value as a data group to said certain storage unit, and (2) when the command is a read command and a data group is read from a certain storage unit corresponding to said second unit ID) according to said command, acquiring a specific value corresponding to said second unit ID from said management storage area, comparing said acquired specific value with a specific value attached to read data in said data group, sending said read data to the external device of said command if the specific values match, and not sending said read data to the external device of said command if the specific values do not match.

14. A storage system configured to communicate with an external device, that is an externally existing device, comprising:

a plurality of storage units for storing data;

a management storage area for storing a unit ID and a specific value corresponding to each storage unit; and a controller, wherein said controller updates the specific value on said management storage area corresponding to a first unit ID of a certain storage unit, whenever receiving a formatting instruction specifying said first unit ID, does not accept a command specifying a second unit ID from the external device while the specific value on said management storage area is being updated, and accepts the command specifying the second unit ID from the external device immediately after the update ends, said second unit ID being identical with or different from said first unit ID, and writes the data, to which said data assurance code and said specific value are attached, to said certain storage unit, and when the command is a write command and data in said command is written to a certain storage unit corresponding to said second unit ID according to said command, said controller acquires a specific value corresponding to said second unit ID from said management storage area, attaches said acquired specific value to the data in said command, determines a data assurance code from said data, also attaches said data assurance code to said data, and writes the data together with said data assurance code and said specific value as a data group to said certain storage unit, and when the command is a read command and a data group is read from a certain storage unit corresponding to said second unit ID according to said command, said controller acquires a specific value corresponding to said second unit ID from said management storage area, compares said acquired specific value with a specific value attached to read data in said data group, checks a data assurance code attached to said read data if the specific values match, and sends said read data to the external device of said command if no error is detected as a result of said check, while if the specific values do not match, said controller prepares data which indicates that nothing is written after the latest formatting instruction, and sends said prepared data to the external device of said command instead of said read data.

* * * * *